United States Patent [19]

Akutagawa

[11] 4,382,968

[45] May 10, 1983

[54] PROCESS FOR MOLDING CHOCOLATE TO MAKE CHOCOLATE BLOCK HAVING ORNAMENTAL PATTERN

[75] Inventor: Tokuji Akutagawa, Tokyo, Japan

[73] Assignee: Akutagawa Confectionery Co., Ltd., Tokyo, Japan

[21] Appl. No.: 260,250

[22] Filed: May 5, 1981

[51] Int. Cl.³ .......................... A23G 1/00; A23G 1/21
[52] U.S. Cl. .................................. 426/249; 426/613; 426/631; 426/660; 426/512; 426/515; 99/426
[58] Field of Search ............... 426/103, 104, 249, 512, 426/515, 613, 660, 631; 99/426

[56] References Cited

U.S. PATENT DOCUMENTS

| | | | |
|---|---|---|---|
| 1,777,896 | 10/1930 | Rossi | 426/104 |
| 1,865,097 | 6/1932 | Gilham | 426/249 |
| 3,091,194 | 5/1963 | Dickinson | 426/249 |
| 3,545,981 | 12/1970 | Klein et al. | 426/515 |
| 3,556,022 | 1/1971 | Westin | 426/515 |
| 4,001,439 | 1/1977 | Zonni et al. | 426/249 |
| 4,105,801 | 8/1978 | Dogliotti | 426/613 |

*Primary Examiner*—Jeanette M. Hunter
*Attorney, Agent, or Firm*—Jordan and Hamburg

[57] ABSTRACT

A process for molding chocolate is provided to make a molded product including a thin ornamental relief pattern of a first chocolate material of one color and a body portion carrying the ornamental pattern and made of a second chocolate material of the other color. The first and second chocolate materials contain 30 to 40 wt. % of base oils and fats and at least 60 wt. % of the oils and fats in one material is the same as those in the other material. The first material in a fluidized state is cast into an engraved ornamental pattern formed on a mold, followed by scraping the face of the mold and rapidly cooling the surface of the first chocolate material to 18° to 22° C. Then the second chocolate material in a fluidized state is cast on the mold to cover the first chocolate to thereby firmly bond or adhere the two materials.

10 Claims, No Drawings

4,382,968

PROCESS FOR MOLDING CHOCOLATE TO MAKE CHOCOLATE BLOCK HAVING ORNAMENTAL PATTERN

BACKGROUND OF THE INVENTION

1. Field of the Invention

The present invention relates to a process for molding chocolate, and particularly to a process for making a molded product of chocolate provided with an ornamental relief pattern carried on a main body of chocolate and having a color different from that of the main body.

2. Prior Art

According to one prior art technique, an ornamental pattern is transferred onto the surface of a molded body of chocolate from a decalcomania sheet. In this known transfer process, the pattern is printed on a sheet using an ink containing an edible pigment and an edible oil to form a decalcomania, which is placed on a body of chocolate and transferred onto the surface of the body under heating. However, the transferred pattern is blurred and not clear to impair the commercial value of the product. A more serious disadvantage of this known process is that a relief pattern including concave and convex portions cannot be formed thereby.

An extrusion method has been developed and known in the art for forming a relief pattern. In this known extrusion method, a material for forming the ornamental relief pattern is extruded from a nozzle of an extruder, and the nozzle or a body of chocolate to be formed thereon with the ornamental relief pattern is moved along a route according to the designed pattern. Since the pattern is formed by a pasty material discharged from the nozzle, which is moving relative to the body of chocolate on which the pattern is to be formed, fineness or sharpness of the formed pattern is limited and a delicate design, letter or picture including slender lines cannot be formed. Also, it is not feasible to form a relief pattern of complicated shape by the extrusion method, since a considerable time is consumed and an extremely delicate control is required.

In order to overcome the aforementioned disadvantages of the conventional processes, an improved process has been proposed by Japanese Patent Publication No. 28809/1971. In this preceding process, three splittable molds are used and a molded product of chocolate having an ornamental relief pattern is molded by two molding stages. The first mold is an engraved block bearing an engraved pattern of desired design. The second mold is a generally flat plate having through-holes. The pattern formed by the through-holes of the second mold is substantially coincident with the engraved pattern of the first mold. At the first molding stage, the first and second molds are combined such that the pattern formed by the through-holes of the second mold is in registry with the engraved pattern of the first mold, and then a fluidized decoration chocolate material is casted. After cooling, the second mold is removed from the first mold, leaving the solidified decoration chocolate material on the first mold. The portions casted in the through-holes of the second mold form projecting extensions after removal of the second mold. In preparation of the second molding stage, the third mold is placed on the first mold. The cavity defined by the first and third molds has a depth greater than the height of the said projecting portions and has a contour defining the outer shape of the molded chocolate product. As a fluidized chocolate material for forming the main body portion is casted in the cavity formed by the first and third molds followed by cooling, said projecting portions made of the decoration chocolate material are embedded into the solidified body portion.

The last mentioned prior art process is in fact improved in that a clear relief pattern can be formed and in that the formed pattern is firmly held by the substrate or body chocolate. However, this process involves troublesome operations, particularly for combining the second mold with the first mold and for removing the second mold from the first mold. The through-holes of the secod mold shall be exactly adjoined to the engraved pattern of the first mold, and an extreme care shall be paid at the step of removing the second mold from the first mold so as not to break or impair the projecting portions made of a fragile material. Due to the difficulties involved in combination and removal of the first and second molds, a delicate pattern including slender lines cannot be formed by this prior art process.

By any of the known technique including the aforementioned prior art processes, a relief pattern including a slender line or portion of in the order of 200 microns and having a thickness of about 100 microns to 3 mm could not be formed on and firmly adhered to a body of chocolate.

OBJECTS AND SUMMARY OF THE INVENTION

An object of the present invention is to provide a simple and efficient process for forming an ornamental relief pattern which is firmly adhered to a body or substrate of chocolate.

Another object of the present invention is to provide a process for molding chocolate to make a product having a delicate and clear relief pattern which is firmly adhered to a body of chocolate.

A further object of this invention is to provide a process for molding chocolate to make a product having an ornamental relief pattern which is firmly adjoined or fused to a body of chocolate rather than embedded in the chocolate body.

A still further object of this invention is to provide a process for molding chocolate to make a product having a body made of chocolate of one color and an ornamental pattern made of chocolate of different color and firmly adhered to the body.

Yet a further object of this invenion is to provide a process for molding chocolate to make a product having a thin ornamental relief pattern including fine but clear lines.

Another object of this invention is to provide a process of molding chocolate to make a product having a body made of chocolate of one color and an extremely thin pattern carried by the body and made of chocolate of different color, the pattern being so thin to become translucent and to alow the color of the body visible as a compounded color.

The above mentioned objects and other objects of this invention will be clarified from the following detailed description.

This invention provides a process for molding chocolate to make a molded product including a thin ornamental relief pattern made of a first chocolate material of one color and a body portion carrying said thin ornamental relief pattern and made of a second chocolate material of different color, said first and second chocolate materials containing 30 to 40%, by weight, of base oils and fats, and at least 60%, by weight, of said base oils and fats contained in one chocolate material being the same as those contained in the other chocolate material, said process comprising the steps of: heating said first chocolate material to be fluidized; casting said fluidized first chocolate material into an engraved pattern formed on the bottom face of a mold; scraping said bottom face of said mold to press said first chocolate material into said engraved pattern and to scrape off the excess material; rapidly cooling the surface of said first chocolate material to a temperature of from 18° C. to 22° C. thereby to crystallize the base oils and fats contained in said first chocolate material to form micro-crystallites; heating said second chocolate material to be fluidized; casting said fluidized second chocolate material in said mold to cover the pattern formed by said first chocolate material and to form said body portion while said micro-crystallites are growing in said first chocolate material so that said fluidized second chocolate material is allowed to penetrate into the interstices of the growing micro-crystallites of the base oils and fats contained in said first chocolate material; cooling the whole body to be solidified by crystallization of the base oils and fats contained in said second chocolate material in all the regions including the interface region at which said second chocolate material penetrates into and adjoins to said first chocolate material; and removing the solidified product from said mold.

DESCRIPTION OF THE INVENTION

The chocolate material used for forming the ornamental relief pattern in this invention is preferably a chocolate material of white color, referred to as "white chocolate". If the "white chocolate" is used to form the relief pattern it is preferred to use brown chocolate for the body or substrate portion of the molded chocolate product. However, the ornamental relief pattern may be made of brown chocolate to be carried on the body portion of white chocolate. Principally, a combination of colors is not limited and may be selected in view of the aesthetic appreciation and the commercial value.

Irrespective of what combination of colors is selected, the chocolate materials both for the ornamental relief pattern and for the body portion shall contain 30 to 40wt.%, preferably 34 to 38 wt.%, and more preferably 36 to 38 wt.%, of base oils and fats. If the total content of base oils and fats is less than 30 wt.%, the consistency of chocolate becomes poor to lower the initial adhesive property at the interface between the pattern and the body portions. Since the base oils and fats contained in two chocolate materials, one for the relief pattern and the other for the base portion, crystallize at the interface region of the pattern and the body, as will be described in detail hereinafter, the adhesive power at the interface region is lowered to an unsatisfactory level if the total content of base oils and fats of either one of the two chocolate materials is less than 30 wt.%. In addition, if the content of base oils and fats contained in the chocolate material for the ornamental relief pattern is less than 30 wt.%, the material cannot be filled into slender or very small cavities engraved to form a fine pattern to impair the fineness or sharpness of the molded relief pattern.

On the contrary, if the content of base oils and fats exceeds 40 wt.%, solidified chocolate becomes nearly transparent rather than translucent to impair the clearness of the relief pattern. On the other hand, if the content of base oils and fats of one chocolate material is differentiated from that of the other chocolate material by more than 10%, by weight, difference in shrinkage coefficient becomes too great leading to cleavage or peeling-off of the chocolate material for the relief pattern at the solidifying step. In order to obviate this disadvantageous phenomenon, if the content of base oils and fats in one chocolate material is 30 wt.%, that in the other chocolate material shall not exceed 40 wt.%.

The base oils and fats which may be used in this invention are preferably those contained in cacao butter. A substitute material for cacao butter or a mixture of such a substitute material with cacao butter may be used. The substitute material for cacao butter, as used herein and in the appended claims, means the material like to the cacao butter and having a composition mainly composed of glycerides of oleic acid, stearic acid and palmitic acid but containing only little glycerides of unsaturated fatty acids having two or more double bonds. Such a substitute material may be synthesized by extracting said glycerides of said three fatty acids from a vegetable oil or fat, such as cotton seed oil, rice bran oil, illippe butter or coconut oil, or an animal fat, such as beef tallow, and processing the separated extract to increase the content of dioleopalmitostearin, which is a characteristic ingredient of cacao butter.

Another important feature of the present invention resides in that at least 60 wt.% of the base oils and fats contained in one chocolate material shall be the same as those contained in the other chocolate material. For instance, if all of the base oils and fats contained in the chocolate material for the relief pattern consists of cacao butter, at least 60 wt.% of the base oils and fats contained in the chocolate material for the body portion shall be cacao butter and preferably all of the base oils and fats contained in the chocolate material for the body portion is cacao butter. If the base oils and fats contained in the chocolate material for the relief pattern are different from those contained in the material for the body portion, the glycerides of fatty acids contained in the former are differentiated from those contained in the latter. The melting point and the shrinkage coefficient of individual glyceride are different from those of other glycerides. Due to difference in these parameters, the relief pattern tends to peel off if the composition of base oils and fats contained therein differs greatly from that contained in body portion. In order to obviate this undesirable peeling tendency, at least 60 wt.% of the base oils and fats contained in one chocolate material shall be essentially the same as those contained in the other chocolate material.

The chocolate materials for the relief pattern and for the body portion are separately prepared. An exemplified composition of the "white chocolate" contains 30 to 40 wt.% of cacao butter, 55 to 65 wt.% of sugar and 5 to 10 wt.% of powdered milk. On the other hand, the most commonly used composition for brown chocolate contains 15 to 25 wt.% of cacao mass, 15 to 25 wt.% of cacao butter, 35 to 45 wt.% of sugar and 15 to 25 wt.% of powdered milk. In preparation of brown chocolate composition, the quantity of cacao butter added in the form of pure cacao butter is adjusted in consideration of the quantity of cacao butter contained in cacao mass so that the total content thereof contained in the final composition ranges within 30 to 40 wt.%. A natural or synthetic flavouring agent, such as vanilla, and an emulsifier, such as lecithin, lysolecithin or cephalin may be added. An ester of sugar and a fatty acid may be added to facilitate uniform growth of fine and stable crystallites of cacao butter.

The chocolate composition is mixed and kneaded, and then passed through a roll refiner to obtain a paste of fine texture. The composition is then processed through the known conching and tempering steps. In the conventional process for molding chocolate, the processed chocolate composition is simply casted in a mold. According to this invention, the fluidized chocolate material for the relief pattern is casted in a mold having a bottom plate engraved with an ornamental design. The engraved grooves forming the designed pattern is shallow. Then, the surface of the bottom plate of the mold is scraped to press the chocolate material into the grooves and concurrently to scrape off the excess material. As has been described before, the chocolate material for the relief pattern can be firmly adhered to the body portion of chocolate according to this invention and a thin and delicate relief pattern including fine concave and convex lines can be formed. The thickness of the relief pattern can be so thinner as to the order of 100 microns to 3 mm, particularly 200 microns to 1 mm.

An important step of the process of this invention is the step of rapidly cooling the surface of the casted chocolate material for the relief pattern to a temperature of from 18° to 22°, preferably 19° to 21°, immediately after casting and scraping the same. Formation and growth of micro-crystallites of the base oils and fats can be promoted by rapidly cooling the chocolate material. The coherent property of the chocolate material is improved by the presence of micro-crystallites of base oils and fats to incrase the adhesive or fixing power developed at the interface region of the relief pattern and the chocolate material for the body portion. Furthermore, when finer crystallites are formed at the interface region, the base oils and fats contained in the material for the body chocolate portion penetrate into the solidified relief pattern material at the interface region more easily to increase the bonding force developed after the body chocolate portion is solidified. If the surface temperature of the relief pattern is cooled too far below 18° C., the pasty property is lost resulting in reduction of coherent property. On the contrary, if the surface temperature after rapid cooling is higher than 22° C., the degree of crystallinity of the relief pattern chocolate material is yet insufficient to provide the interface region with satisfactory coherence and there is a risk of crumbling of the relief pattern due to insufficient solidification. For the reasons as set forth hereinabove, it is essential that the surface temperature of the relief pattern after rapid cooling shall be controlled within the range of 18° C. to 22° C. In case where the chocolate material for the relief pattern is fluidized to have a temperature of from 29° C. tc 31° C., the surface temperature thereof after rapid cooling can be lowered to a temperature within the range of 18° C. to 22° C. by placing the casted chocolate in an atmosphere of about 5° C. for about 2 to 3 minutes. Although the time period required for lowering the surface temperature within the range defined above varies depending on the thickness of the relief pattern and the heat capacity and thermal conductivity of the mold, it is important to cool the surface temperature of the relief pattern material rapidly to 18° C. to 22° C., preferably 19° C. to 21° C., thereby to allow the body chocolate material to adhere firmly to the thus cooled and semisolidified surface of the relief pattern material and to facilitate molding and solidification of the body chocolate material.

The next stage includes the step fluidizing the chocolate material for the body portion, the step of casting the fluidized chocolate material for the body portion over the relief pattern material in which fine crystallites are continuously growing, and the step of cooling the whole body. Prior to the cooling step, air contained in the chocolate material may be removed by the degassing step. Degassing may be effected by the vibration method or any other methods. Throughout the casting and cooling steps, base oils and fats contained in the body chocolate material penetrate into the interface region of the semi-solidified relief pattern chocolate material, where they are crystallized while being intermingled or entangled with the crystallites formed from the relief pattern material so that powerful bond is developed in the interface region. Cooling is continued until the whole chocolate body is solidified. The time period required for cooling varies depending on the cooling temperature and the thickness of the chocolate body. If a chocolate material for the body portion is fluidized to have a temperature of 29° C. to 31° C. and cooled in an atmosphere of 4° C. to 7° C., the chocolate material is generally solidified for about 15 to 25 minutes. After the body chocolate material has been solidified accompanying with crystallization of the base oils and fats contained therein, the solidified product is removed from the mold to obtain a chocolate block provided with an ornamental relief pattern or design.

As will be apparent from the foregoing, according to this invention, a very thin ornamental relief pattern can be firmly adhered to a body portion of chocolate. It is possible to form an ornamental relief pattern which is thin enough to be translucent so that the color of the body portion can be visible through the translucent relief pattern, as desired. In such a case, the color of the body portion is compounded with the color of the relief pattern so that the color of the pattern is seen as a somewhat changed color by the viewer.

EXAMPLES OF THE INVENTION

This invention will now be described more specifically by referring to some examples thereof. However, it should be noted that the following examples are only illustrative and this invention is not limited thereby. In the examples, "part" stands for "part by weight" unless otherwise specified.

EXAMPLE 1

White chocolate was prepared by mixing 33 parts of cacao butter, 60 parts of sugar, 7 parts of powdered milk and 0.3 parts of lecithin in accordance with the following procedure.

About a half of cacao butter contained in the aforementioned composition was heated to about 60° C. to be liquefied and transferred to a continuous kneader, where sugar and powdered milk were added thereto little by little to be mixed and kneaded. After adding 0.15 parts of lecithin, kneading was continued at about 45° C. for 0.5 hour to mix the mixture intimately. The mixture was passed through a roll refiner continuously to pulverize the particles contained therein, and then conveyed to a rotary conche, where the remaining part of cacao butter was added. The content in the conche was conched at about 55° C. for 12 hours during which time the remaining part of lecithin was added and the temperature was lowered finally to 45° C. to complete the conching processing.

After being processed through the conching operation as set forth above, the chocolate material is transferred to a tempering machine to be tempered and the temperature of chocolate discharged from the tempering machine is adjusted to 29° C.

Separately, normal brown chocolate was prepared by mixing 20 parts of cacao mass (Content of Cacao Butter: 50 to 55 wt.%), 20 parts of cacao butter, 40 parts of sugar, 20 parts of powdered milk and 0.3 parts of lecithin. The preparation procedure was generally similar to that employed for the preparation of white chocolate as mentioned just above, except in that cacao mass and cacao butter were heated and melted separately and then transferred to the continuous kneader.

The white chocolate discharged from the tempering machine and maintained to have a temperature of 29° C. was then casted into a polycarbonate mold having a bottom plate engraved with an ornamental relief pattern including fine concave and convex lines. The minimum width of the lines was 200 microns, and the thickest portion of the relief pattern was about 1 mm and thinnest portion of the relief pattern was about 100 microns. After casting, the face of the bottom plate of the mold was scraped. Immediately after scraping, the mold carried on a conveyor belt was passed through a cooling chamber maintained at 5° C. for 2 minutes to cool or quench the surface of the casted white chocolate material rapidly to 21° C.

Then, the brown chocolate discharged from the tempering machine and maintained to have a temperature of 29° C. was casted over the semi-solidified white chocolate to form a body portion of 5 mm in thickness. After cooling in a cooling chamber maintained at 5° C. for 18 minutes, a solidified chocolate block was removed from the mold to obtain a chocolate product having a brown body portion and a relief pattern of white chocolate adhered to the surface of the brown body portion.

Relief lines of about 200 microns in width and about 100 microns in thickness were sharply molded to form clear lines. The portions of the pattern formed by the thin layers of white chocolate were seen to have compounded colors because the brown color of the body was viewed through the translucent white relief pattern.

After storing in a refrigerator maintained at 20° C. for one day, the chocolate block was put out. A portion of the relief pattern was scratched by a fingernail to try to peel off the same. However, the relief pattern was not peeled off. When a strong pressing power was applied on the chocolate block, the body was broken into pieces and each broken piece carried the fragment of relief pattern as it had been carried by the unbroken chocolate block. Another chocolate block was maintained at a room temperature of 25° C. for an hour, and a similar trial was made to peel off the relief pattern by finger as described hereinabove, but the relief pattern was not peeled off. When a strong pressing power was applied on the chocolate block, the relief pattern layer was embedded in the body a little and the pattern was cracked together with the body.

EXAMPLE 2

Similar procedure was repeated as in Example 1, except in that another kind of white chocolate was prepared by mixing 30 parts of cacao butter, 65 parts of sugar, 5 parts of powdered milk and 0.3 parts of lecithin. A chocolate block having an ornamental relief pattern made of the thus prepared white chocolate was molded similarly as in Example 1.

Using a finger, a similar trial as in Example 1 was made to peel off the relief pattern of white chocolate to obtain similar results as obtained in Example 1.

EXAMPLE 3

Using the same white chocolate as used in Example 1 as the material for the relief pattern, similar procedure as in Example 1 was repeated except in that the body of a chocolate product was made of a brown chocolate material prepared by mixing and kneading 30 parts of cacao mass (Content of Cacao Butter: 50 to 55 wt.%), 23 parts of cacao butter, 45 parts of sugar, 2 parts of powdered milk and 0.3 parts of lecithin.

A similar peeling test by finger was conducted using a test specimen stored for a day in a refrigerator at 20° C., and a similar result was obtained as in Example 1. However, when another test specimen which had been allowed to stand in an atmosphere at 28° C. for an hour was pressed intensely by finger, a portion of the relief pattern was embedded in the body of the chocolate block but no cracking was observed.

EXAMPLE 4

A white chocolate material for the ornamental relief pattern was prepared similarly as the white chocolate composition used in Example 1, except in that 33 parts of cacao butter of the latter-mentioned composition was replaced by 20 parts of cacao butter and 13 parts of a substitute material for cacao butter. The substitute material for cacao butter used in this Example is available from Kanegafuchi Chemical Industry Co., Ltd. under the trade name of "Belco BE 10" which is derived from a starting material mainly composed of illippe butter. The brown chocolate material as used in Example 3 was used as the material for the body portion. Generally in accordance with the procedure as in Example 1, a chocolate block was prepared except that the mold was held in the cooling chamber for 3 minutes and 30 seconds to cool the surface temperature of white chocolate to 18° C.

The result of a peeling test by finger was similar to that obtained in Example 1.

COMPARATIVE EXAMPLE 1

The same white and brown chocolate materials as used in Example 1 were used. After scraping the surface of the bottom plate of the mold, the mold was held in a cooling chamber maintained at 4° C. for 4 minutes and 20 seconds to cool the surface temperature of the scraped face of the white chocolate rapidly to 16° C. Other steps were similar as those described in Example 1.

The result was tremendous in that the relief pattern of white chocolate was separated from the body portion of brown chocolate at the step of removing the solidified product from the mold.

COMPARATIVE EXAMPLE 2

The same white and brown chocolate materials as used in Example 1 were used. After scraping the surface of the bottom plate of the mold, the mold was passed through a cooling chamber maintained at 6° C. for 2 minutes. The surface temperature of the scraped face of the white chocolate material was cooled to 23° C. Other steps were similar to those described in Example 1.

The obtained chocolate product was of no commercial value in that concave and convex portions of the relief pattern were collapsed.

COMPARATIVE EXAMPLE 3

A similar procedure was followed as in Example 1, except in that the white chocolate material as used in Example 1 was replaced by a white chocolate material prepared by mixing and kneading 28 parts of cacao butter, 65 parts of sugar, 7 parts of powdered milk and 0.3 parts of lecithin.

The obtained chocolate product was of lesser commercial value in that fine lines of the relief pattern were discontinuous.

COMPARATIVE EXAMPLE 4

A white chocolate material for the ornamental relief pattern was prepared similarly as the white chocolate composition used in Example 1, except in that 33 parts of cacao butter of the latter-mentioned composition was replaced by 16.5 parts of cacao butter and 16.5 parts of the same substitute material for cacao butter, i.e. "Belco BE 10" available from Kanegafuchi Chemical Industry Co., Ltd.. The same brown chocolate material as used in Example 1 was used for molding the body portion. The operation steps were the same as described in Example 1.

The result was that the relief pattern of white chocolate was separated from the body portion of brown chocolate at the step of removing the solidified product from the mold and the white chocolate material was left in the engraved grooves of the bottom plate of the mold.

COMPARATIVE EXAMPLE 5

The same white chocolate material as used in Example 2 was used to form the relief pattern. In accordance with the similar procedure as in Example 1, a brown chocolate material was prepared by using a composition consisting of 33 parts of cacao mass (Content of Cacao butter: 50 to 55 wt.%), 25 parts of cacao butter, 40 parts of sugar, 2 parts of powdered milk and 0.3 parts of lecithin.

Although a chocolate block was molded in accordance with the same procedure as in Example 1, the relief pattern made of the white chocolate material set forth above was separated from the body made of the brown chocolate material at the step of removing the solidified block from the mold and the white chocolate material was left in the engraved cavities of the bottom plate of the mold.

In the foregoing description, the present invention has been specifically disclosed by referring to some examples thereof. However, it should be appreciated that various modifications and variations can be easily made by those skilled in the art without departing from the spirit of the invention. It is, thus, intended to include all such modifications and variations within the wide scope of the present invention defined by the appended claims.

What is claimed is:

1. A process for molding chocolate to make a molded product including a thin ornamental relief pattern made of a first chocolate material of one color and a body portion carrying said thin ornamental pattern and made of a second chocolate material of different color, said first and second chocolate materials containing 30 to 40%, by weight, of base oils and fats, and at least 60%, by weight, of said base oils and fats contained in one chocolate material being the same as those contained in the other chocolate material, said process comprising the steps of:
   (a) fluidizing said first chocolate material by heating;
   (b) casting said fluidized first chocolate material into an engraved pattern formed on the bottom face of a mold;
   (c) scraping said bottom face of said mold to press said first chocolate material into said engraved pattern and to scrape off the excess material;
   (d) rapidly cooling the surface of said first chocolate material to a temperature of from 18° C. to 22° C. thereby to crystallize the base oils and fats contained in said first chocolate material to form micro-crystallites;
   (e) fluidizing said second chocolate material by heating;
   (f) casting said fluidized second chocolate material in said mold to cover the pattern formed by said first chocolate material and to form said body portion while said micro-crystallites are growing in said first chocolate material so that said fluidized second chocolate material is allowed to penetrate into the interstices of the growing micro-crystallites of the base oils and fats contained in said first chocolate material;
   (g) cooling the whole body to be solidified by crystallization of the base oils and fats contained in said second chocolate material in all the regions including the interface region at which said second chocolate material penetrates into and adjoins to said first chocolate material; and
   (h) removing the solidified product from said mold.

2. A process as claimed in claim 1, wherein said ornamental relief pattern is made of white chocolate and said body portion is made of brown chocolate.

3. A process as claimed in claim 1, wherein the thickness of said ornamental relief pattern ranges within 100 microns to 3 mm and said pattern includes a line of 200 microns in minimum width.

4. A process as claimed in claim 1, wherein said base oils and fats are selected from the group consisting of cacao butter, a substitute material for cacao butter and a mixture thereof.

5. A process as claimed in claim 4, wherein said substitute material for cacao butter is a derivative derived from cotton seed oil, rice bran oil, illippe butter, coconut oil and beef tallow, and a mixture thereof.

6. A process as claimed in claim 2, wherein said white chocolate contains 30 to 40 wt.% of cacao butter, 55 to 65 wt.% of sugar and 5 to 10 wt.% of powdered milk.

7. A process as claimed in claim 2, wherein said brown chocolate contains 15 to 25 wt.% of cacao mass, 15 to 25 wt.% of cacao butter, 35 to 45 wt.% of sugar and 15 to 25 wt.% of powdered milk.

8. A process as claimed in claim 7, wherein the added quantity of said cacao butter is adjusted so that the content of cacao butter contained in said brown chocolate amounts to 30 to 40 wt.%.

9. A process as claimed in claim 1, wherein said first chocolate material is heated to have a temperature of from 29° C. to 31° C. thereby to be fluidized at the step (a), and wherein the rapid cooling at the step (d) is effected by placing the mold in an atmosphere of about 5° C. for about 2 to 3 minutes to thereby cool the surface of said first chocolate material to the defined temperature of from 18° C. to 22° C.

10. A process as claimed in claim 1, wherein said second chocolate material is heated to have a temperature of from 29° C. to 31° C. thereby to be fluidized at the step (e), and wherein the cooling at the step (g) is effected by placing the mold in an atmosphere of 4° C. to 7° C. for 15 to 25 minutes.

* * * * *